(12) United States Patent
Borella et al.

(10) Patent No.: US 7,324,499 B1
(45) Date of Patent: Jan. 29, 2008

(54) METHOD AND SYSTEM FOR AUTOMATIC CALL MONITORING IN A WIRELESS NETWORK

(75) Inventors: Michael S. Borella, Naperville, IL (US); Peter F. Koss, Northbrook, IL (US); Chandra Warrier, Schaumburg, IL (US); Ronald J. Madsen, Bloomingdale, IL (US); Thomas Foss Rooney, Des Plaines, IL (US)

(73) Assignee: UTStarcom, Inc., Alameda, CA (US)

( * ) Notice: Subject to any disclaimer, the term of this patent is extended or adjusted under 35 U.S.C. 154(b) by 1102 days.

(21) Appl. No.: 10/610,286

(22) Filed: Jun. 30, 2003

(51) Int. Cl.
H04J 3/24 (2006.01)
H04Q 7/24 (2006.01)
H04Q 7/20 (2006.01)

(52) U.S. Cl. ............ 370/349; 370/328; 370/338; 370/401; 455/435.1; 455/456.3

(58) Field of Classification Search ........... 370/328, 370/331, 338, 349, 401; 455/432.1, 433, 455/435.1, 436, 414.1, 456.3; 709/239, 249
See application file for complete search history.

Primary Examiner—Afsar Qureshi (57) ABSTRACT

A method and system for call monitoring in a wireless network by querying various network components for information about a call path through the wireless network. The network components in the wireless network may include foreign agent control nodes, home agent control nodes, packet data serving nodes, home agents, and/or authentication, authorization, and accounting servers. These network components may be queried to determine the foreign agent and the home agent to which a call is assigned. The foreign agent and the home agent may also define information about a call on the wireless network, i.e., the state of the call. Advantageously, the information provided by the foreign agent and the home agent may allow for monitoring a call path through the wireless network.

16 Claims, 6 Drawing Sheets

METHOD AND SYSTEM FOR AUTOMATIC CALL MONITORING IN A WIRELESS NETWORK

BACKGROUND

1. Field of Invention

This invention relates to communication networks and more particularly to a method and system for automatic call monitoring in a wireless network.

2. Description of Related Art

The Internet Protocol ("IP") is an addressing protocol designed to route data traffic within a network and/or between networks. The Internet Protocol is used on many computer networks including the Internet, intranets and other networks. Internet Protocol addresses are typically assigned to "immobile" nodes on a network. An immobile node may be moved to a different computer network, but is typically associated with a static physical location.

The Mobile Internet Protocol (hereinafter "Mobile IP") allows mobile nodes to transparently move between different Internet Protocol sub-networks ("subnets"). Request for Comments (RFC) 2002 published by the Internet Engineering Task Force (IETF) define protocols for managing mobility of mobile stations. Mobile IP is described in detail in the Internet Engineering Task Force Request for Comment 2002, C. Perkins, October 1996, which is incorporated herein by reference in its entirety, and in "Mobile IP: The Internet Unplugged," by J. D. Solomon, Prentice-Hall, 1998, ISBN-0-13-856246-6, which is incorporated herein by reference.

Internet Protocol addresses are typically assigned to mobile nodes based on their home Internet Protocol subnet. The home subnet is connected to an external network (e.g., the Internet or an intranet) with a "home agent" that serves as the subnet's gateway router. As is well known in the art, the gateway connects computer networks using different networking protocols or operating at different transmission capacities. Also, as is known in the art, a router translates differences between network protocols and routes data packets to an appropriate network node or network device.

When a mobile node "roams," (i.e., dynamically changes its physical location), it periodically transmits "agent solicitation" messages to other gateway routers. A mobile node also listens for "agent advertisement" messages from other gateway routers. When a mobile node receives an agent advertisement message indicating that it is now on a foreign subnet, it registers with a "foreign agent" and its home agent. The registration involves authenticating the call with a foreign agent and a home agent authentication, authorization, and accounting (AAA) server. The registration with the foreign agent allows the mobile node to receive data on the foreign subnet. The registration with the home agent indicates the mobile node is away from "home" (i.e., away from its home subnet).

As a result of the mobility of users to different foreign networks, it is becoming difficult to be track and troubleshoot user session/calls and connections. With the mobile IP architecture, a number of network devices are required to store the real-time status of each ongoing user session. Typically, each network component may know a part of information about a call, but does not know complete information about a call. Just locating the device upon which a user session is active can be challenging. As a result, now that mobile networks have been deployed, operators are experiencing a large degree of difficulty in handling the management of the networks.

Most of the network components in the wireless network are managed by some type of simple network management protocol ("SNMP") interface or Management Information Base ("MIB"). The SNMP interface and MIB expose information associated with the real-time status of a mobile call connection. While most network components are managed by some form of SNMP, each network component typically has their own management systems and some of these systems are only element managers, designed to interact with only a single component. Vendors of network components may provide a set of scripts, programs, manual entry, and parsing of data files to determine those network components having information about a call, but management of the wireless network remains still challenging, requiring a lot of manual entry and parsing.

Thus, it is desirable to provide a method and system for automatic call monitoring in the wireless network. The automatic call monitoring should facilitate determining real-time information about a call.

SUMMARY OF THE INVENTION

In accordance with preferred embodiments of the present invention, some of the problems associated with obtaining real-time call and connection information associated with a mobile station, such as a call path and location of the mobile station are overcome. The embodiments of the present invention, provide a call tracing and monitoring system to alleviate the difficulty in monitoring and managing these wireless systems.

Components of wireless mobile networks can be managed from a console with tools that can be used to identify the user's location and call path through the network, as well as determine network usage and capacity.

A method and system for automatic call monitoring in a wireless network is presented. Locating information about a particular call in the wireless network involves querying one or more of the network components assigned to the call or connection. The network components in the wireless network may include foreign agent control nodes, home agent control nodes, packet data serving nodes, home agents, and/or authentication, authorization, and accounting servers. These network components may be queried to determine the foreign agent and the home agent to which a call is assigned. The foreign agent and the home agent may also define information about the particular call on the wireless network, i.e., the state and real-time status of the call. Advantageously, the information provided by the foreign agent and the home agent may allow for the integration and automation of techniques to monitor a call connection path through the wireless network, identify a user's location, and determine network usage and capacity.

These as well as other aspects and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described with reference to the following drawings, wherein.

DETAILED DESCRIPTION OF PREFERRED EMBODIMENTS

Exemplary Mobile IP System

Figure 1:
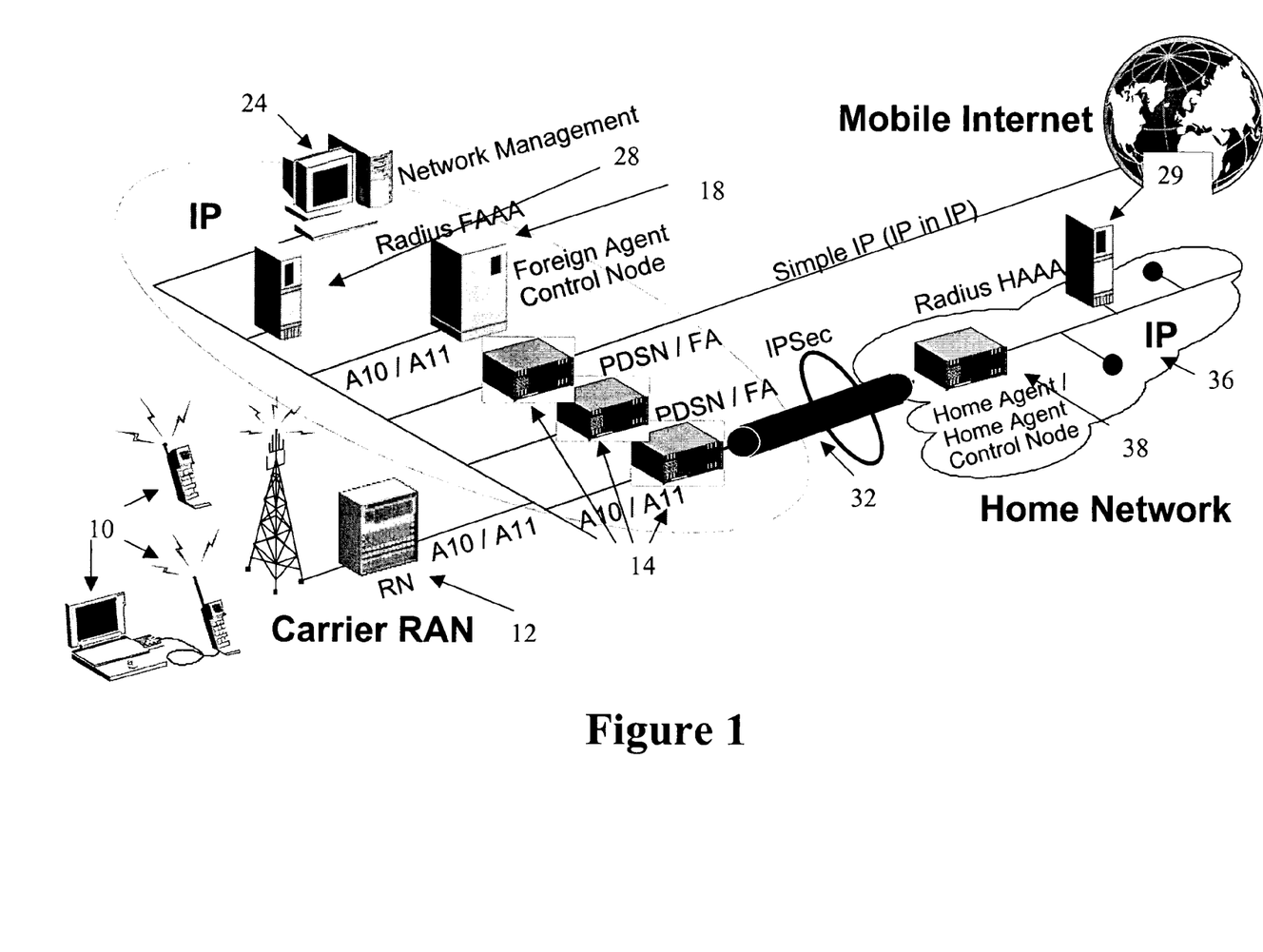
FIG. 1 is an overview diagram of a communication network in which exemplary embodiments of the present may be employed.

FIG. 1 is a block diagram of a communication network in which exemplary embodiments of the present invention may be employed. Shown in the preferred embodiment is a typical cdma2000 (code division multiplexed access) network architecture where mobile users may roam throughout the system and access the network using a mobile station such as a cell phone, personal digital assistant, or laptop personal computer, etc.

Currently, there are two main variations of 3G (third generation), cdma2000 and UMTS (Universal Mobile Telecommunications System) as known in the art. These systems differ mainly in their access technologies and their relationships with legacy 2G and 2.5G systems. While UMTS can be deployed throughout most of the world, Europe is the geographic area in which there is the most focus today. The cdma2000 technology is currently deployed in the US, Canada, South America, Japan, Korea, China, India, as well as several Eastern European countries, and is the exemplary system discussed herein.

Those skilled in the art will appreciate that many of the elements described in the wireless networks are functional entities that may be implemented as discrete components or in conjunction with other components, in any suitable combination or location. Still further, various functions described herein as being performed by one or more entities may be carried out by a processor programmed to execute an appropriate set of computer instructions stored in memory. Provided with the present disclosure, those skilled in the art can readily prepare the appropriate set of computer instructions to perform the various functions.

In the preferred embodiment, roaming mobile station 10 connects through a carrier radio access network ("RAN") 12 to packet data serving nodes ("PDSN") 14 in the visited network. The mobile station 10 may be a cellular phone, a pager, or a portable computer with wireless modem. Indeed, the mobile station 10 could take a variety of forms now known to those skilled in the art or later developed by those skilled in the art.

Figure 2:
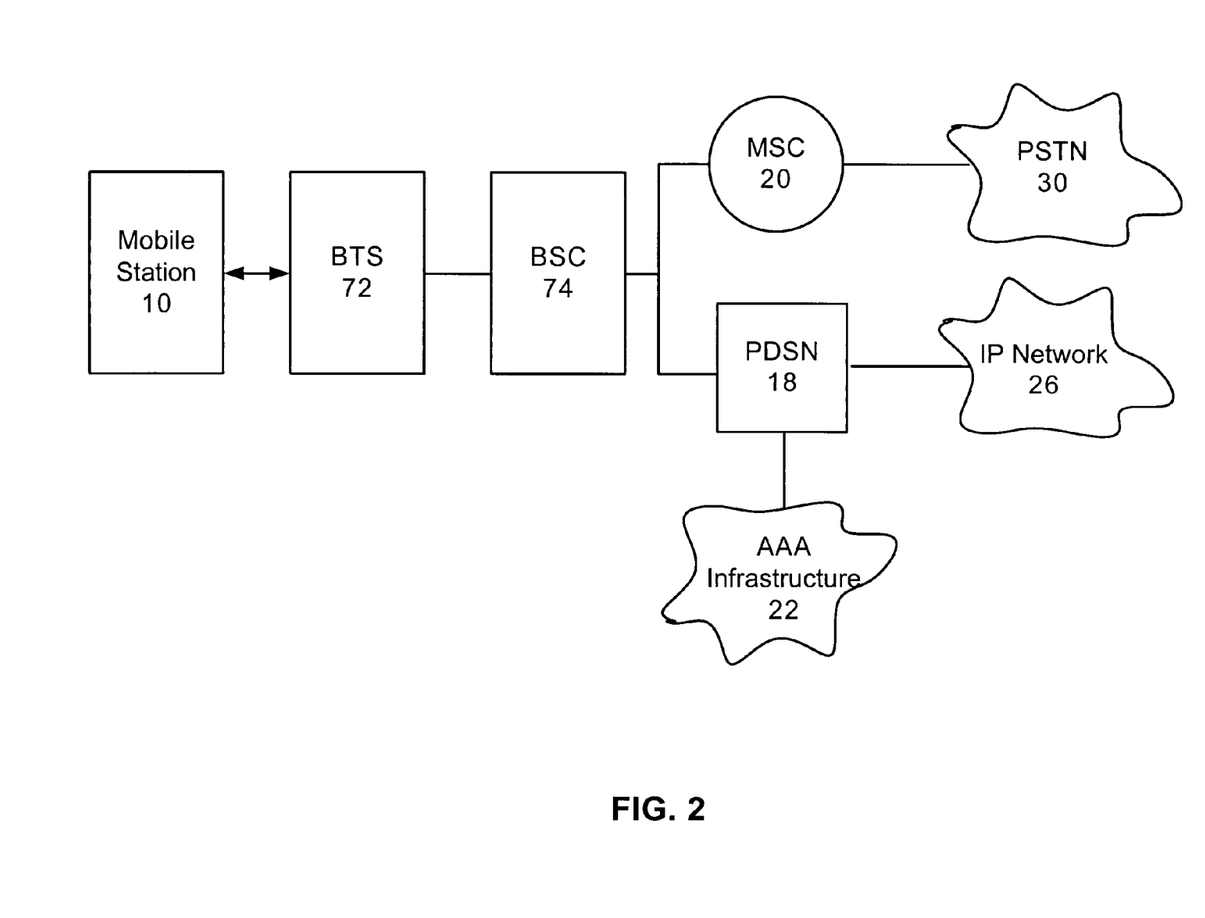
FIG. 2 is a block diagram showing further detail of the communication network of FIG. 1 in which exemplary embodiments of the present may be employed.

Additionally, the communication network may include a subnet as shown in more detail in FIG. 2. Interim Standards (IS) 835, 2000, and 2001, the contents of which are herein incorporated by reference in its entirety, describe details of the subnet. Referring to FIG. 2, the subnet may facilitate transmission and reception of signals with the mobile station 10, over an air interface. By way of example, the subnet may include a base station transceiver ("BTS") 72 arranged to communicate with the mobile station 10 over the air interface. The BTS 72 may be coupled with a base station controller ("BSC") 74.

The BTS 72 and BSC 74 combination may be collectively referred to as a base station. The base station may produce a radiation pattern that defines a coverage area of the subnet. The base station may, in turn be coupled to a mobile switching center ("MSC") 20 and a PDSN 14 (FIG. 1). In a preferred embodiment, the base station is also coupled to foreign agent control nodes ("FACN") 18.

The FACN 18 load balances calls between PDSNs and maintains a copy of most of the mobile station profile, i.e., information associated with each mobile station, in the PDSN 14. The MSC 20 may be coupled to a public switched telephone network ("PSTN") 30 while the PDSN 14 may be coupled to an IP network 26. The MSC 20 may switch calls with a terminal on the PSTN 30. Alternatively, the PDSN 14 may switch packets onto the IP network 26.

The PDSN 14 may be communicatively coupled to a home agent gateway server assigned by a home agent control nodes ("HACN") 38. The HACN 38 provides load balancing and redundancy between home agent ("HA") and thus also has a complete copy of the mobile station profile on the HAs including the call status. The home agent is typically embodied as a gateway router connecting networks using different networking protocols or operating at different transmission capacities. As is also know in the art, a router translates differences between network protocols and routes data packets to an appropriate network node or device.

Typically, there are a plurality of M PDSNs per FACN and a plurality of N HA's per HACN 38. Thus, there may be some number of FACNs in the network each servicing a group of PDSNs, and some number of HACNs in the networks, each servicing a group of HAs.

The foreign agent and the home agent may be software entities. Specifically, the foreign agent may reside on a packet data serving node 14 and the home agent may reside on a home subnet gateway router 38 in an IP network 26, respectively, as depicted in FIG. 1. The PDSN 14 provides a packet-based interface into the IP network and facilitates communication with the home agent server. The PDSN 14 and the home subnet gateway router may be communicatively coupled together by a virtual tunnel 32.

The PDSN 14 and the home agent gateway server 38 provides mobile IP connections via a tunnel 32 (FIG. 1). The tunnel may allow the foreign agent and the home agent, running on the PDSN 14 and running on the home agent gateway server 38, respectively, to exchange messages between each other associated with establishing and maintaining a call. As is known in the art, the home agent and the foreign agent may create the virtual tunnel 32 by encapsulating data packets inside other data packets by adding additional tunnel packet headers.

The mobile user session is encapsulated in Point-to-Point Protocol ("PPP") between the Mobile Node 10 and the PDSN 14. Data between the RN 12 and the PDSN 14 is tunneled over the A10/A11 interface, which uses Generic Routing Encapsulation ("GRE"). Data traffic for mobile IP sessions, between the PDSN 14 and the HA 38 is tunneled using either GRE or IP-in-IP encapsulation. For more information on IP-in-IP encapsulation and Generic Routing Encapsulation see IETF RFCs-1701 and 2003 respectively, incorporated herein by reference.

Additionally, the PDSN 14 and the home agent gateway server 38 may be coupled to AAA infrastructure 22. The AAA infrastructure 22 may enable a foreign agent and a home agent to provide authentication, authorization, and accounting services (AAA) to the mobile station 10 over the communication network. The AAA infrastructure 22 may include one or more servers, e.g., a foreign AAA server ("FAAA") and a home AAA server ("HAAA"). The home agent and the foreign agent may access the HAAA and FAAA server, respectively, to authenticate the mobile station 10 to communicate over the subnet. In this embodiment, Remote Authentication Dial-In User Service ("RADIUS") protocols are shown as included in FAAA 28 and HAAA 29.

In the preferred embodiment, the wireless network is managed by a network management device 24, typically a console that allows the operator to query each device. In order to support the retrieving and setting of parameters, each managed device may expose internal data via an SNMP interface, or Management Information Base ("MIB"). SNMP and MIBs are well known in the art. In this embodiment, shown is Network Management device 24 to facilitate the monitoring and diagnostics of the system.

While FIG. 1 exemplifies a general wireless network, there are many different types of networks with different features and variations deployed commercially. For example, typically there are two types of calls, simple IP and mobile IP. Simple IP calls provide basic IP network access, with the mobile being assigned an IP address from the visited network. If a mobile using simple IP roams to a new RAN, it is likely to be assigned a different PDSN and therefore assigned a new IP address, breaking any data transfer in progress.

On the other hand, mobile IP calls allow an IP address to be assigned by the home network and kept by the mobile as it roams. A mobile IP call will maintain application state and data transfer between handoffs, enhancing the overall user experience. Mobile IP calls are tunneled between the PDSN and home agent using either IP-in-IP or GRE, and IPsec may be performed over the IP-in-IP/GRE tunnel. In fact, every service provider may have their own unique architecture based on their technical and business requirements. Some network architectures are centralized, with foreign agents and home agents co-located in one or more points of presence, while others employ a distributed architecture. Of course, other arrangements are also possible.

As discussed herein above, 3G wireless networks include a number of devices that store the real-time status of each ongoing user call connection, but no one device knows the complete details on each connection.

Exemplary Call Tracing Methods

Call tracing is an operation to identify a user's location and call connection path through the network, as well as determine network usage and capacity. Determining the call path through the wireless network may require locating the network components to which a particular call is assigned. The particular call may be identified in the network components by an International Mobile Subscriber Identity ("IMSI"), an Electronic Serial Number (ESN), a Network Address Indicator ("NAI"), or an assigned IP address. IMSI is the hardware identifier of the mobile station engaged in the call, and typically takes the form of a 10-digit phone number. ESN is the hardware identifier of the Mobile burnt in the factory. NAI is essentially an email address of the mobile station, such as user@serviceprovider.com. The assigned IP address is the IP address that the mobile station engaged in the call has been assigned for the call session. Of course, the particular call may be identified in other ways as well.

In accordance with an exemplary embodiment of the present invention, one or more of the network components of a call associated with a mobile station are queried to locate information about the call. The information may include information regarding the real-time status of the call, as described in more detail below. The network components in the wireless network may include foreign agent control nodes, home agent control nodes, packet data serving nodes, home agents, and/or authentication, authorization, and accounting servers.

For instance, the foreign agent and the home agent associated with a call may reside on one of a plurality of PDSNs and home agent gateway servers assigned by the FACN and HACN, respectively. These network components may be queried to determine the foreign agent and the home agent to which a particular call is assigned. The information associated with the call may be obtained from the foreign agent and the home agent via the SNMP interface or MIB, for example. Because the PDSNs store all three parameters that can be used to identify the user, this call trace can be performed using any of the user identifiers as well. The PDSN stores a host of information regarding the call. This information includes IMSI, NAI, Assigned IP address, ESN (electronic serial number), Primary and backup FAAA servers, Call type (simple IP, mobile IP), Duration of call, Active time of call, Idle time remaining, Session time remaining, Active/dormant status, Assigned home agent, IPv6 prefix, IPv6 assigned address, AAA session ID, AAA correlation ID, Serving PCF, Base station ID (BSID), Service option, Always on indicator, Total bytes sent, Total bytes received, Remote address counts (number of bytes sent/received to/from particular IP addresses, Number of active/dormant transitions, and L2TP (Layer 2 Tunneling Protocol) LNS (L2TP Network Server) (if the call uses L2TP). In addition to this list, any information in the IS-835 UDR can be provided Discussed below is the general process to perform a call trace starting from the foreign network to the home network (with the assumption that the call type is mobile IP, and that the foreign and home networks are operated by the same administrative entity).

The first step is to determine the assigned PDSN for the user. Because the ratio of FACNs to PDSNs is typically quite low, it is preferable to first query the FACNs and then use the information from it to determine the IP address of the assigned PDSN. If one or more FACN's exist, then each FACN can be queried sequentially until the IP address of the PDSN that the one the user is assigned to is found.

If there are no FACNs in the network, then the FAAA 28 or HAAA 29 can be used to determine the IP address of the assigned PDSN 14. This is possible if these devices contain enough SNMP state to contain the user/call information. If neither the FACNs nor FAAAs/HAAAs are available, each PDSN can be queried individually until the one the user is assigned to is found. From either the latter two methods, one can determine the IP address of the PDSN that the user is assigned to.

Once the IP address of the PDSN that the user is assigned to is discovered, then that PDSN can be queried to determine the IP address of the assigned HA. This is possible because each PDSN contains information regarding the assigned HA. Once the assigned HA is found, then one can query the HA for call information. Optionally, the IP address of the assigned HACN can be obtained from the information received from the HA. Then the HACN can then be queried to obtain information regarding the real-time status of the call as well. Information typically available from the Home Agent typically includes NAI, Assigned IP address, Foreign agent IP address (PDSN address), Primary and backup FAAA servers, Duration of call, AAA session ID, AAA correlation ID, VLAN tag, VPN gateway server (if the call type is VPN), and HACN IP address. In addition, the Home Agent Control Node includes all information from the HA is available at the HACN, except that the HACN will also know the assigned HA IP address.

Also described is the general process of a call trace from home to foreign networks. Because the HAs do not contain information regarding the user's IMSI, only two of the three user identifiers (NAI and IP address) can be used in the call trace.

Typically, the first step is to determine the assigned HA. Although each HA can be queried, more efficient methods are possible. This can be done by either querying each HACN sequentially until the IP address of the HA assigned to the user is found, or querying each HA sequentially until the HA to which the user is assigned to is found. Once the assigned HA is found, then query the HA for the information.

From the information received from the HA, then one can determine the IP address of the assigned FA (PDSN). Once the assigned FA (PDSN) is determined, then query that device for the information. Optionally, one can determine the IP address of the assigned FACN from the information from the FA and then query the FACN for the information regarding the user. Further call trace methods of the preferred embodiments are described below in more detail.

Call Trace Foreign Agent to Home Agent

Figure 3:
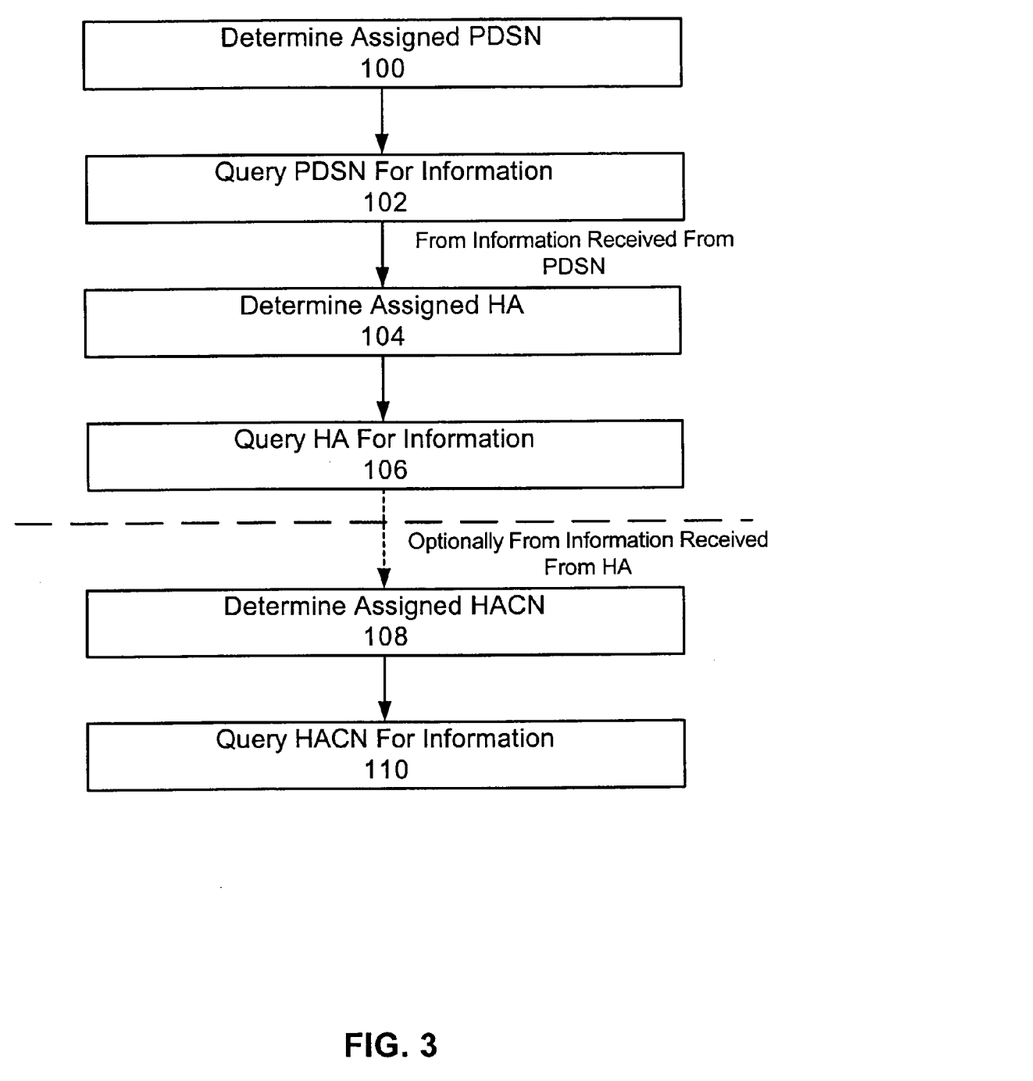
FIG. 3 is a flow chart that illustrates a call trace from a foreign agent to a home agent to determine information associated with a particular call.

FIG. 3 is a flow chart further detailing an exemplary method for perform a call trace from the foreign agent to the home agent. At step 100, the PDSN to which a particular call is assigned may be determined. The particular call may be identified by, for example, an NAI or an IP address of the mobile station engaged in the call. After the PDSN to which the call is assigned is determined at step 102, the PDSN may be queried for real-time call status associated with the call as previously discussed herein. Part of the information queried may be the identification of the HA assigned to the call. At step 104, the HA to which the call is assigned may be determined. At step 106, the HA may be queried for information associated with the call.

In certain embodiments, the network management system, such as network management 24 of FIG. 1, may also support receiving AAA records and other system activity. For instance, in acting as a "shadow server" the PDSN sends a copy of the AAA packets to the management system such that the management system receives the system activity. Thus, advantage can also be taken of call information obtained from the network management system itself.

Optionally, the HACN which assigned the HA to the call may also be determined. The HA may define information that identifies the HACN assigned to the HA. From the information received from the HA, the HACN can be determined at step 108. Then, at step 110, the HACN can then be queried to obtain information associated with the call.

Figure 4:
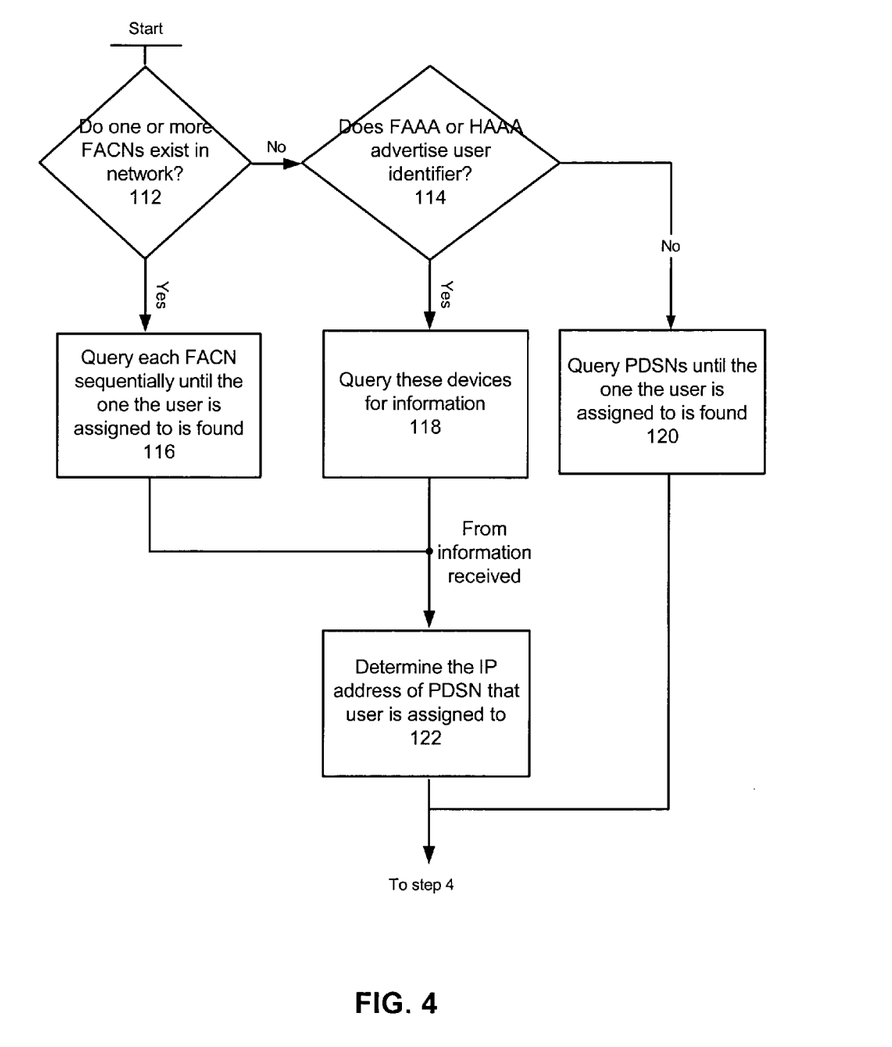
FIG. 4 is a flow chart that illustrates in more detail determining facilities to which a call is assigned.

FIG. 4 is a flow chart that illustrates in more detail the process for determining the PDSN to which the call is assigned at step 100 of FIG. 2. At step 112, a determination is made whether a FACN such as FACN 18 of FIG. 1 exists in the wireless network. If a FACN exists in the wireless network then, at step 116, each FACN is queried until the FACN that assigned the PDSN is found. At step 122, the FACN is queried for the PDSN to which the call is assigned. Typical information found at the FACN include, IMSI, NAI, Assigned IP address, ESN, Call type (simple IP, mobile IP), Duration of call, Assigned home agent, IPv6 assigned address, Serving PCF, Base station ID (BSID), and Service option.

If there are no FACNs in the network, then the FAAA or HAAA may be queried to determine PDSN to which the call is assigned. At step 114, a determination is made whether the FAAA or HAAA advertises that it is assigned to a particular mobile station. If the FAAA or HAAA is assigned to a particular mobile station, then at step 1118, the FAAA or the HAAA may be queried for the information associated with the call. At step 122, the PDSN that services the call may be determined using the information from the FAAA or HAAA.

If the FAAA or HAAA does not advertise that it services the particular mobile station and one or more FACN are not in the wireless network, then at step 120, each PDSN in the wireless network may be queried until the PDSN to which the call is assigned is found.

Call Trace Home Agent to Foreign Agent

Figure 5:
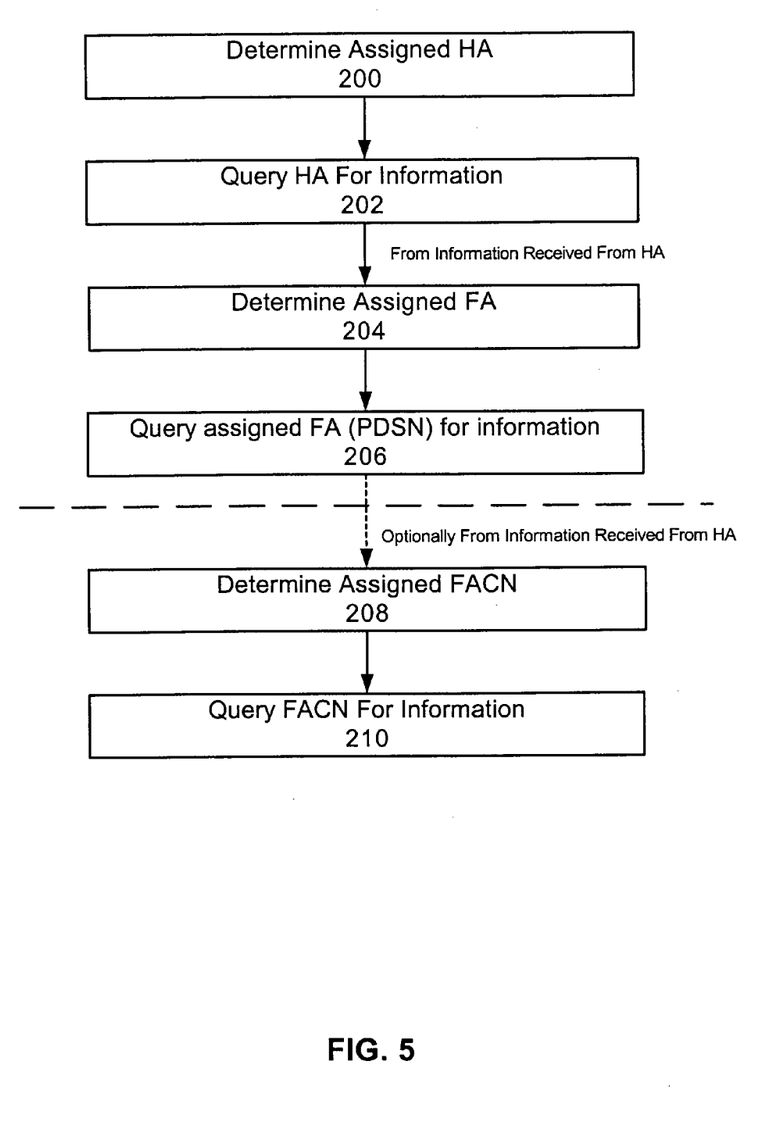
FIG. 5 is a flow chart that illustrates a call trace from a home agent to a foreign agent to determine information associated with a particular call.

FIG. 5 is a flow chart that illustrates how to perform a call trace from the home agent to the foreign agent. At step 200, the HA to which a call is assigned may be determined. As described above, the particular call may be identified by, for example, an NAI or an IP address of the mobile station engaged in the call. When the HA to which a call is assigned is found, at step 202, the HA may be queried for information associated with the call. Part of the information may be the FA to which a call is assigned. From that information, the FA to which a call is assigned may be determined at step 204. At step 206, the assigned FA may be queried for information associated with the call.

Additionally, the FACN which assigned the HA to the call may be determined. The FA may define information that identifies the FACN assigned to the FA. From the information received from the FA, the FACN can be determined at step 208. Then, at step 210, the FACN may be queried to obtain information associated with the call.

Figure 6:
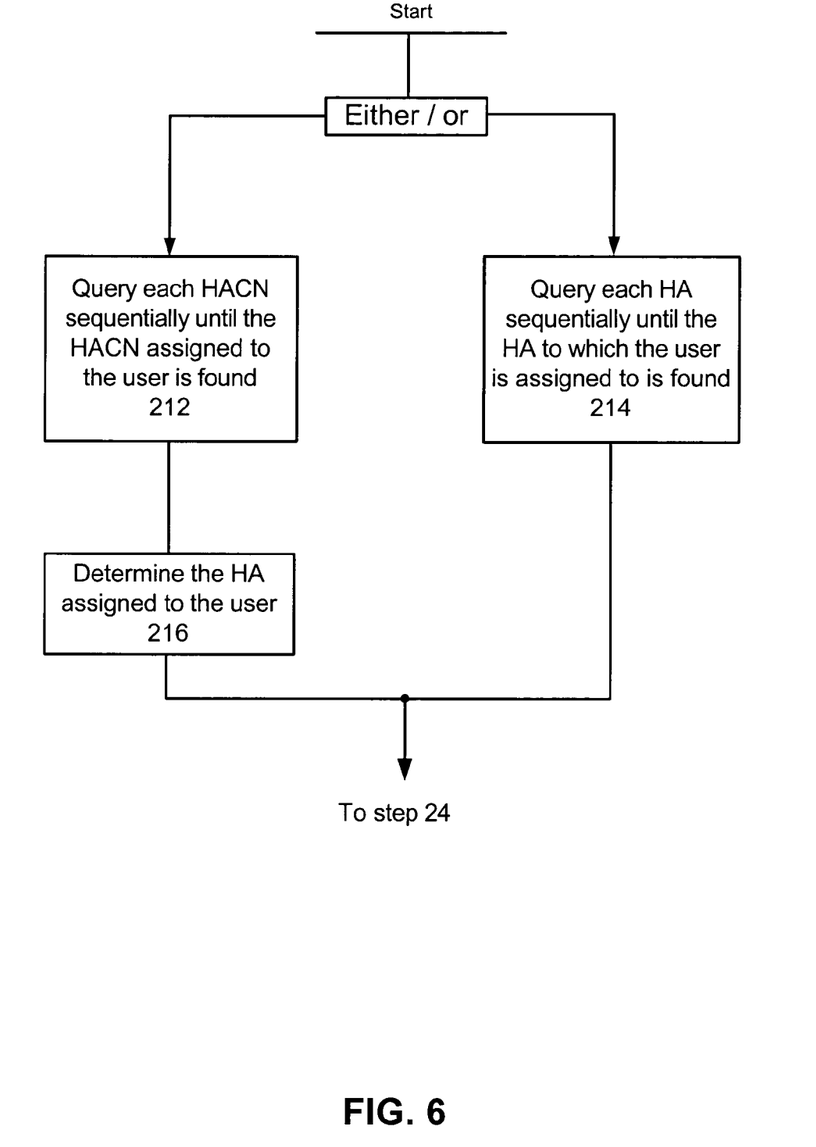
FIG. 6 is a flow chart that illustrates in more detail determining the home agent to which a call is assigned.

FIG. 6 is a flow chart that illustrates in more detail the process for determining the HA to which a particular call is assigned, at step 200 of FIG. 4. At step 212, each HACN may be queried until the HACN which assigned the HA is found. Then, at step 216, the HACN which assigned the HA is queried to determine HA to which the call is assigned. Alternatively, at step 214, each HA may be queried until the HA to which the call is assigned is found.

The above exemplary embodiments can be implemented as functions to automate the tracking of real-time call and connection information associated with a user's mobile station. Components of wireless mobile networks can be managed from an operator console with tools that alleviate an operator's difficulty in monitoring and managing the mobile wireless system. The management system can also allow periodic querying of the status of a given user so that once the call is traced for a user, the information for that user can be updated and kept live. User calls can tracked and call status updated across PDSN handoffs for the duration of the call. Using the principles described herein, a number of other system monitoring, troubleshooting and diagnostic functions are also readily possible by those skilled in the art.

Exemplary System Diagnostics

According to another aspect of the present invention, system diagnostics can also be provided to monitor system performance and health. For instance, system diagnostics can be performed to determine whether the various signaling paths associated with setting up and maintaining a session is functioning properly. Using the concepts of the present embodiments, a flexible set of tools can identify the user's location and call path through the network, as well as determine network usage and capacity. Following is a list of signaling interfaces that are involved.

1. A11 signaling interface between PDSN and PCF
2. RADIUS interface between PDSN and AAA
3. MIP interface between PDSN and HA
4. Network connectivity between PDSN and a Default Router or specific Router
5. RADIUS interface between HA and AAA
6. CALEA interface between PDSN and DF PDSN to PCF Interface To verify the PDSN to PCF connection, an SNMP command may be sent to the PDSN with a specified PCF address (or Security Association index) to query the connectivity between the PDSN and PCF. The PDSN could either send a ping packet or a A11 Registration update message with dummy parameters which the PCF will reject. The PDSN could return a status of success for the command if a reply was received from the PCF and the round trip time to verify the connection.

PDSN/HA to AAA Interface

An SNMP command will be sent to the PDSN/HA with a specified AAA address (or a configured AAA, using an index) to query the connectivity between the PDSN/HA and AAA. The PDSN/HA could send an Access Request with a dummy user, which the AAA will reject. The PDSN/HA could return a status of success for the command if an Access Reject was received from the AAA and the round trip time.

PDSN to HA Interface

Upon receipt of an SNMP command, a dummy MIP RRQ can be sent by the PDSN to the instructed HA. The HA would reject the request which can be used to determine connectivity status and round trip times.

Network Connectivity from PDSN/HA

Upon receipt of an SNMP command a ping packet can be sent by the PDSN or HA to the Default Router or a instructed router. The ping reply can be used to determine connectivity.

Wiretap Interface Between PDSN and DF/PM

Upon receipt of an SNMP command a ping packet can be sent by the PDSN to a configured DF and a specified PM from the SNMP command to determine connectivity. In a particular example, the DF (Delivery Function) and PM (Packet Manager) are nodes that are used for CALEA (Communication Assistance for Law Enforcement Agencies), The PDSN is indicated during call setup, either from the AAA or the RAN, that a session needs to be monitored. The PDSN would send a CALEA session establishment request to the DF. The DF accepts/rejects the requests and replies to the PDSN with the address of a PM (Packet Manager). The PDSN would then replicate the data exchanged between the Mobile and the network and send it to the PM. Thus an entire record of the Mobile session is available at the PM for Law Agencies to analyze.

The present embodiments of the invention allow for the integration of system monitoring for a mobile IP system and provides for the automation of call monitoring and tracing. Using these same principles, integrated and automated system diagnostics are also provided. Other uses and advantages of the present embodiment will also be readily apparent by those skilled in the art.

Exemplary embodiments of the present invention have thus been illustrated and described. It will be understood, however, that changes and modifications may be made to the invention as described without deviating from the spirit and scope of the invention, as defined by the following claims.

What is claimed is:

1. A method for call monitoring in a wireless network, the method comprising:
determining a packet data serving node to which a call is assigned by querying an authentication, authorization and accounting server for the packet data serving node;
querying the packet data serving node for information about the call available by the packet data serving node;
based on the information available by the packet data serving node, determining a home agent to which the call is assigned; and
querying the home agent for information about the call available by the home agent.

2. The method of claim 1, further comprising determining a home agent control node to which a mobile station is assigned; and querying the home agent control node for information available by the home agent control node.

3. The method of claim 1, wherein determining the packet data serving node to which the call is assigned comprises querying multiple packet data serving nodes in the wireless network for the packet data serving node to which the call is assigned.

4. The method of claim 1, wherein determining the packet data serving node to which the call is assigned comprises querying a foreign agent control node in the wireless network for the packet data serving node to which the call is assigned.

5. The method of claim 1 wherein the query is to a management system which acts as a shadow server to the packet data serving node.

6. The method of claim 1, wherein the packet data serving node defines a foreign agent of the wireless network.

7. The method of claim 1, wherein the information available by the home agent and the information available by the packet data serving node is selected from the group consisting of an NAI (network address indicator), an IP address, and an hardware identifier of a mobile station's terminal.

8. The method of claim 1, wherein the method steps are periodically repeated to provide updated call monitoring.

9. A method for call monitoring in a wireless network, the method comprising:
determining a home agent to which a call is assigned by querying an authentication, authorization and accounting server;
querying the home agent for information about the call available by the home agent;
based on the information available by the home agent, determining the packet data serving node to which the call is assigned; and
querying the packet data serving node for information about the call available by the packet data serving node.

10. The method of claim 9, further comprising based on the information available by the packet data serving node, determining a foreign agent control node to which the call is assigned; and querying the foreign agent control node for information available by the foreign agent control node.

11. The method of claim 9, wherein determining the home agent to which the call is assigned comprises querying a home agent control node in the wireless network for the home agent to which the call is assigned.

12. The method of claim 9, wherein determining the home agent to which the call is assigned comprises querying multiple home agents in the wireless network for the home agent to which the call is assigned.

13. The method of claim 9, wherein the packet data serving node defines a foreign agent in the wireless network.

14. The method of claim 9, wherein the information available by the home agent and the information available by the packet data serving node is selected from the group consisting of an e-mail address, an IP address, and a hardware identifier of a mobile station's terminal.

15. A method for call monitoring in a wireless network, the method comprising:

querying various network components in the wireless network to determine a home agent and a foreign agent to which a call is assigned, wherein the various network components are selected from the group consisting of foreign agent control nodes, home agent control nodes, packet data serving nodes, home agents, and/or authentication, authorization and accounting servers; and querying the home agent and the foreign agent for information about the call available by the home agent and the foreign agent.

16. The method of claim 15, wherein the query steps are periodically repeated to update the call monitoring.

* * * * *